United States Patent [19]

Tröster et al.

[11] Patent Number: 4,887,917
[45] Date of Patent: Dec. 19, 1989

[54] WHEEL MOUNT AND METHOD OF CONNECTING THE PARTS OF A WHEEL MOUNT

[75] Inventors: Manfred Tröster, Bad Kissingen; Heinrich Hofmann, Schweinfurt, both of Fed. Rep. of Germany

[73] Assignee: FAG Kugelfischer Georg Schäfer (KGaA), Fed. Rep. of Germany

[21] Appl. No.: 326,421

[22] Filed: Feb. 27, 1989

Related U.S. Application Data

[63] Continuation of Ser. No. 17,355, Feb. 24, 1987, abandoned.

[30] Foreign Application Priority Data

Mar. 13, 1986 [DE] Fed. Rep. of Germany ....... 3608346

[51] Int. Cl.$^4$ ................ F16C 13/00; F16C 43/04; B21K 1/40
[52] U.S. Cl. .................... 384/543; 29/159.3; 301/105 R; 384/504; 384/537; 464/178
[58] Field of Search ............ 384/449, 543, 544, 537, 384/559, 586, 589, 504; 464/178, 906; 301/124 R, 126, 105 R; 280/96.1, 96.3; 180/70.1; 29/159.3

[56] References Cited

U.S. PATENT DOCUMENTS

| 3,589,747 | 6/1971 | Asberg ........................ 280/96.1 |
| 4,150,553 | 4/1979 | Aucktor ..................... 180/70.1 X |
| 4,427,085 | 1/1984 | Aucktor ..................... 464/178 X |
| 4,473,129 | 9/1984 | Guimbretiere ............... 464/178 X |
| 4,493,388 | 1/1985 | Welschof et al. ............ 384/544 X |

FOREIGN PATENT DOCUMENTS

| 2007801 | 5/1979 | United Kingdom . |
| 2082989 | 3/1982 | United Kingdom ........... 301/105 R |
| 2181498 | 4/1987 | United Kingdom ............... 301/126 |

Primary Examiner—Thomas R. Hannon
Attorney, Agent, or Firm—Ostrolenk, Faber, Gerb & Soffen

[57] ABSTRACT

A wheel mount for a motor vehicle including a hub which is welded to another part, such as a swivel joint or a holding part. The hub carries on it the inner ring of the anti-friction bearing for the hub. Projecting axially from the hub and from the other part are correspondingly radially spaced projections which, prior to welding and deformation of the projections, are of lengths great enough to hold the hub and the other part axially apart. Upon welding temperature being achieved at the projections, e.g. by friction, the hub and the other part are pressed together which deforms the projections, forming beads of deformation, and the hub and other part are welded at the beads of deformation. The hub and other part are pressed together until the axial ends of the hub and other part contact. There is radial clearance at both sides of the projections and the beads of deformation for preventing direct heat transmission from the sides of the projection and the beads of deformation to the hub, and particularly to the inner ring of the bearing which would be damaged by that heat.

11 Claims, 3 Drawing Sheets

WHEEL MOUNT AND METHOD OF CONNECTING THE PARTS OF A WHEEL MOUNT

This is a continuation of application Ser. No. 17,355 filed on Feb. 24, 1987, now abandoned.

BACKGROUND OF THE INVENTION

The present invention relates to a method of connecting parts of a wheel mount and also to the wheel mount, particularly where the wheel is welded to a hub in the vicinity of the inner ring of the wheel bearing.

In such a wheel mount, large axial forces and moments are exerted on the inner ring of the wheel bearing, particularly while the vehicle is traveling around curves. The inner ring of the bearing which is arranged toward the rear side of the hub must be well supported axially. This can be done by welding on of support parts in the manner described in Federal Republic of Germany OS No. 28 48 169, which corresponds to British Application No. 2,007,801A. However, in that published application, the arrangement of the parts present in the region of the place of weld produce certain major disadvantages. The place of weld is very close to the inner ring of the anti-friction bearing of the wheel. Since the heat of welding can pass to the inner ring on a very short path over large cross sections of metal, which has good thermal conductivity, the danger of overheating of the inner ring and thus of ring hardness failure is great. Furthermore, particularly when friction welding is used, there is a danger of possible impermissible axial stressing of the inner ring since precise axial positioning of the hub and of the homokinetic swivel joint with each other is not possible with the known arrangement of weld surfaces. Drive to the wheel hub and wheel is through the homokinetic swivel joint. In the event that the weld surfaces have inaccurate dimensions, then axial displacement of the inner ring is even possible, which is also very unfavorable for the operation of the anti-friction bearing. Accordingly, the position of the resting surface of the homokinetic swivel joint which is opposite the end surface of the inner ring cannot be obtained with sufficient precision.

SUMMARY OF THE INVENTION

The object of the present invention is therefore to provide a method of simply connecting the parts of a wheel mount so that the connection can withstand high loads, the transfer of heat to the inner ring of the wheel bearing can be reduced and the desired initial axial stressing of the bearing can be obtained.

In a motor vehicle, the wheel mount includes a hub which carries at least one ring, separate from the hub itself, which is the inner ring of an anti-friction bearing. That hub is to be welded to a homokinetic swivel joint or to another holding part for the wheel hub. The invention is concerned with connecting the hub to the swivel joint or holding part. To this end, there are projections which project respectively axially inwardly from the hub and correspondingly axially outwardly from the swivel joint or holding part. These projections protrude axially sufficiently so that when the hub and joint or holding part are axially moved together, the respective projections abut before the two parts come together. Those projections are preferably annular, and they rub as they rotate past one another. At least the projection from the hub protrudes axially beyond the end surface of the inner ring of the bearing on the hub, so that the initial contact between the projections would occur before the bearing inner ring becomes involved and heated.

The projections are heated, for example, by being rubbed together, until they reach their welding temperatures. Then the hub and the joint or holding part are moved axially toward one another, and the projections are pressed against one another to deform the projections. Finally, the swivel joint or at least an axial projection from the joint or from the holding part comes to rest flatly against the hub and particularly against the end of the inner ring of the anti-friction bearing. Pressing together of the hub and the joint or holding part is stopped and the welding point between the projections is cooled or permitted to cool. The contact between the swivel joint or holding part, on the one hand, and the inner ring of the bearing on the hub, on the other hand, is located radially outward of the welding point and of the axial projections which are welded.

To further reduce the transmission of heat from the welding point at the projections to the hub and particularly to the bearing inner ring, there are annular free or open spaces radially inward and possibly also radially outward of the two welded projections and which spaces remain even after the projections are deformed. The spaces are, therefore, also axially behind each of the projections, so that heat from the projections can be transmitted to the hub and holding part, respectively, only through the thin base of the projections and not by conduction through the sides of the projections.

In one embodiment, at the axially inwardly facing side of the hub, that is the side facing toward the swivel joint, and radially immediately outward of the hub projection, the hub, and more important the bearing inner ring at the hub, has a corner recess which provides a space into which the outwardly deformed bead of the annular weld projection extends. A further clearance space may be defined axially behind that recess so as to minimize direct transmission of heat from the deformed bead of the projection to the bearing inner ring adjacent the projection.

It is preferable that the projection from the swivel joint or holding part be developed slightly weaker than the projection from the hub, or that the projection from the swivel joint even be provided with a circumferential groove outside the region of deformation, so that in the event of over large axial stresses, the projection from the swivel joint or holding part will break, and not the projection from the hub or the weld itself. In that case, only the drive of the wheel would be damaged. The wheel itself would remain connected to the automotive vehicle.

The ring-shaped projections on the wheel hub and, for instance, on the homokinetic swivel joint enables welding to be used, for instance, simple friction welding. With the invention, only the projections are heated. Direct transfer of the heat of welding to the bearing inner ring is avoided. The heated projections can then be deformed by axial movement of the hub toward the homokinetic swivel joint until one end surface of the homokinetic swivel joint comes against the end surface of the bearing inner ring. This can be done precisely at the pressure necessary for the prestressing of the bearing. Upon the cooling of the projections in the region of the place of the weld, there is additionally obtained a change in length. As a result, due to the resting of the homokinetic swivel joint against the inner ring, desired prestressing of the bearing rings is obtained. The weld connection is produced with the required certainty, at the latest upon the deformation of the projections. Excess material can possibly attach in the form of beads without problem due to the isolated position of the projections. The wheel-bearing unit which is connected in this manner can transmit large axial and tilting forces without the bearing inner ring or the unit being overstressed. Furthermore, the weld seam is shielded from environmental influences, and the danger of rusting is thus reduced.

In accordance with a preferred embodiment, shell-side and bore-side free spaces are located so as to face the axial projections to be welded prior to their deformation. In this way, the transfer of heat is made difficult, and weld beads can be formed unimpeded. As a result, the weld connection is improved. Furthermore, if the weld seam is in the correct position, the one bead from the projections ca arch out so toward the inner ring that it effects the axial fixing of that ring. This weld seam and bead preferably extends into a corner recess of the inner ring. In this way, weight and space in the axial direction are saved, which is of great importance in the case of automotive vehicles.

Other objects and features of the invention will be explained with reference to the drawings.

DESCRIPTION OF THE PREFERRED EMBODIMENTS

Figure 1:
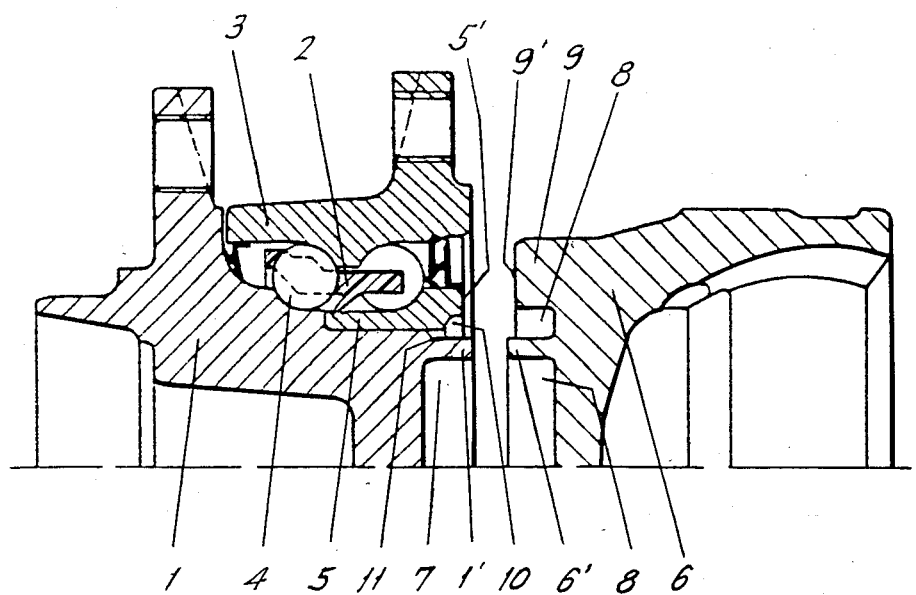
FIG. 1 shows a partial cross section through a wheel mount according to the invention, prior to the welding.

In FIG. 1, the wheel mount comprises the hub 1. The anti-friction bearing 2 wraps generally around the axially inboard section of the hub. The bearing 2 comprises with the outer ring 3, the double row of rolling bodies 4 and the inner ring 5 which is on but is separate from the hub 1. A homokinetic swivel joint 6 is to be attached to the hub. The axially inwardly extending annular projection 1' of the hub 1 is radially inward a short distance from the bearing inner ring 5. Projection 1' is opposite the outwardly extending annular projection 6' of the homokinetic swivel joint 6. Respective shell-side or radially outward and bore-side or radially inward free spaces 7 and 8 are provided in the hub and the joint to reduce the transfer of heat to the bearing inner ring 5 in a very desirable manner.

Connection of the hub 1 and the joint 6 is effected, for instance, by rotating the projections 1' and 6' against each other while their end sides are being pressed against each other until the welding temperature is reached. At this time or afterward, the hub and joint are moved axially toward each other, which deforms the projections 1' and 6' until the end surface 9' of the separate, radially more outward projection 9 comes to rest against the end surface 5' of the inner ring 5. This situation can be noted from FIG. 2. The weld beads 1" and 6" are produced by the deformation. They deform both radially outwardly and radially inwardly as they are flattened. The weld bead 1" extends into a corner recess 10 of the inner bearing ring 5 and thus contributes to the axial fixing of that ring by blocking its movement axially. This results in smaller axial forces having to be transmitted by the projection 9.

To further reduce the heat transfer to the bearing 2 upon welding, the hub projection 1' is provided with a circumferential groove 11 axially outward of the groove 10 and further into the hub.

The projection 6' (see FIG. 2) preferably has a smaller cross section than the projection 1'. As a result, in the event of overloading, the intended place of break is at the project ion 6' and only the homokinetic swivel joint is separated while the wheel attachment is not affected.

Figure 2:
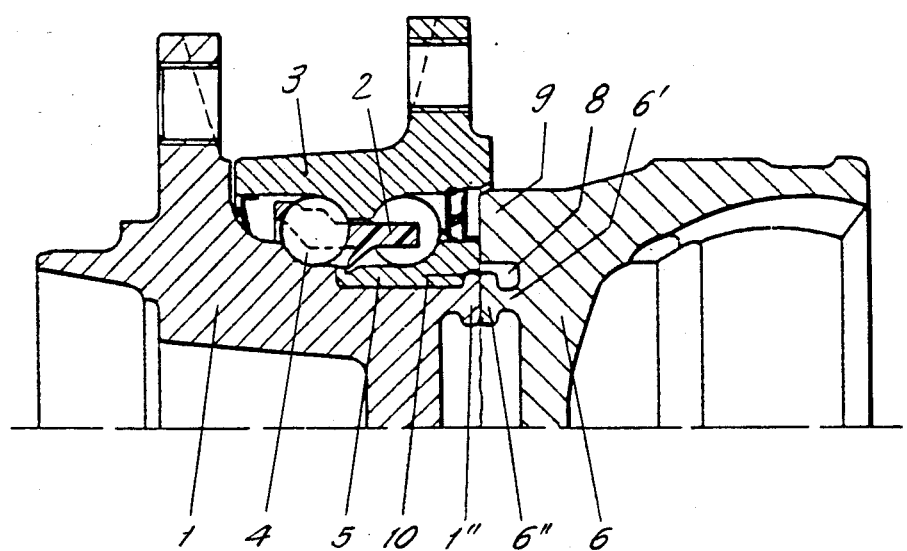
FIG. 2 shows the wheel mount of FIG. 1 after the welding.
Figure 3:
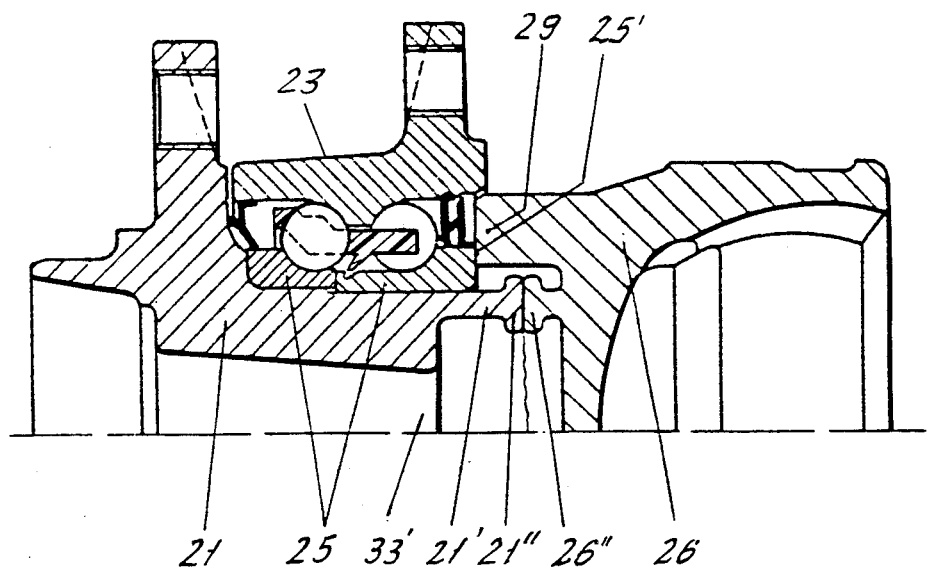
FIG. 3 shows a first variant of the mount of FIG. 2.

FIG. 3 shows a first variant of FIG. 2, with corresponding elements having corresponding reference numerals to FIGS. 1 and 2, but raised by 20. In this case, two separate inner rings 25 of the anti-friction bearing 22 are seated on the hub 21. Each ring serves one of the two rows of rolling elements. In this case, to increase the distance between the point of welding and the inner ring 25 closer to the joint 26, prior to welding and the deformation of the projections, the projection 21' of the hub 21 was longer than the projection 26' of the homokinetic swivel joint 26. This can be seen in FIG. 3 because the resulting weld beads 21" and 26" are shifted inwardly toward the joint. The weld seam which lies between the beads can in this connection be checked in a simple manner by viewing devices through the opening 33'.

Figure 4:
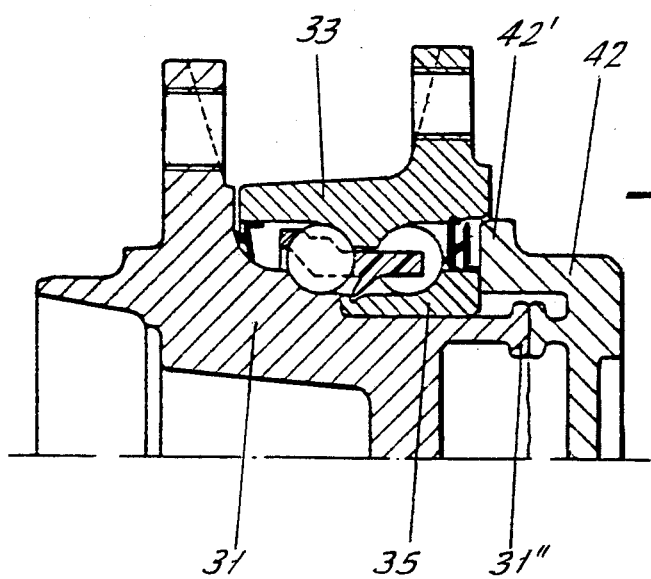
FIG. 4 shows a second variant of the mount in FIG. 2.

FIG. 4 shows a second variant of a wheel mount which approximately corresponds to that shown in FIGS. 2 and 3, with corresponding elements having corresponding reference numerals to FIGS. 1 and 2, but raised by 30. This variant differs from FIG. 2 in that the homokinetic swivel joint is replaced by a holding part 42 having another axial projection 42' rather than 9'. This embodiment can be used in the case of nondriven wheels. Otherwise, the same procedure is used as in FIG. 2 so that the same advantages also may result.

Figure 5:
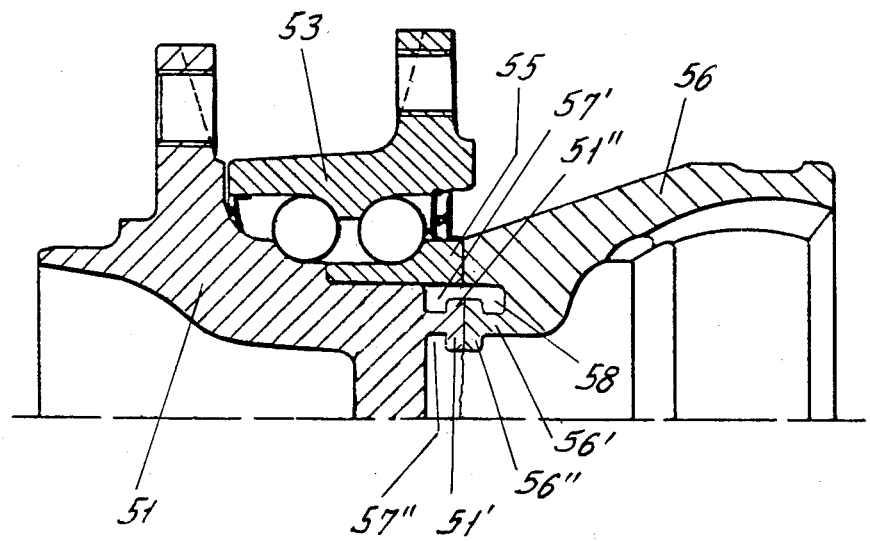
FIG. 5 shows a third variant of the mount in FIG. 2.

FIG. 5 shows a third variant of the hub and homokinetic swivel joint shown in FIG. 2, with corresponding elements having corresponding reference numerals to FIGS. 1 and 2, but raised by 50. As compared with the embodiment shown in FIG. 2, the projection 51' is spaced radially further inward from the inner ring 55 than in the embodiment of FIG. 2 so that no recess 10 is needed. The joint 56 is correspondingly slightly differently shaped so that its projection 56' will meet the projection 51' at their respective deformed beads 51", 56" when the hub and joint are welded. The deformation of the projections 51' and 56' produces the same circumferential space 58 behind the projection bead 56". It also produces the annular space 57' behind the bead 51" on the projection 51 radially outwardly of the projection 51' and, as before, produces the annular open space 57" radially inward of the projection 51' The annular spaces 57' and 57" prevent direct contact between the sides of the projection 51' and the adjacent inner ring 55.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A wheel mount assembly, comprising:

(A) a wheel hub, said wheel hub having a periphery and an axial end;
(B) an anti-friction bearing, said anti-friction bearing including an inner ring, said inner ring of said anti-friction bearing being carried by said periphery of said wheel hub, said inner ring of said anti-friction bearing having a side; and
(C) a part which is welded to said wheel hub, said part having an axial end; and
wherein said wheel hub includes a projection which projects in an axial direction toward said part, said projection of said wheel hub being radially inward of said inner ring of said anti-friction bearing; and
wherein said part includes a projection which projects axially toward said projection of said wheel hub to meet said projection of said wheel hub; and
wherein said wheel mount assembly is assembled by:
   (a) assembling said projections together end to end such that said projections have a combined axial length sufficient to space said axial end of said wheel hub from said axial end of said part;
   (b) welding said projections together by heating said projections;
   (c) deforming said heated projections without directly conducting the heat of said welding step through said projection of said wheel hub to said inner ring of said anti-friction bearing; and
   (d) prestressing said inner ring of said anti-friction bearing by pressing said projection of said part against said side of said inner ring of said anti-friction bearing during said deforming step.

2. The assembly of claim 1, wherein said prestressing step includes shortening said deformed projections by cooling said projections.

3. The assembly of claim 1, wherein, prior to said welding step, said hub includes axially extending open spaces for reducing heat conduction through said hub.

4. The assembly of claim 1, wherein said deformed projections define an annular space.

5. The assembly of claim 1, wherein said projection of said part is weaker than said projection of said hub so as to be more likely to break under stress than said projection of said hub.

6. The assembly of claim 1, wherein said part is a homokinetic swivel joint.

7. The assembly of claim 1, wherein said part is a non-driven holding part.

8. The assembly of claim 1, wherein each of said deformed projections includes a bead of deformation, said hub being shaped so that said beads of deformation do not contact either said hub or said inner ring so as to reduce heat transmission to said inner ring during said welding step.

9. The assembly of claim 8, wherein said inner ring is located near said projection of said hub, said hub and said inner ring defining an annular recess which accommodates said beads of deformation.

10. The assembly of claim 8, wherein said beads of deformation are approximately aligned with the position of contact between said inner ring and said projection of said part.

11. The assembly of claim 8, wherein said beads of deformation are not aligned with the position of contact between said inner ring and said projection of said part.

* * * * *